(12) United States Patent
Ronse

(10) Patent No.: US 11,519,774 B2
(45) Date of Patent: Dec. 6, 2022

(54) EVALUATION OF FILLING STATE IN CARGO TRANSPORT

(71) Applicant: OVINTO CVBA, Aalter (BE)

(72) Inventor: Frederick Ronse, Knokke-Heist (BE)

(73) Assignee: OVINTO CVBA, Aalter (BE)

( * ) Notice: Subject to any disclaimer, the term of this patent is extended or adjusted under 35 U.S.C. 154(b) by 0 days.

(21) Appl. No.: 16/961,154

(22) PCT Filed: Jan. 16, 2019

(86) PCT No.: PCT/EP2019/051043
§ 371 (c)(1),
(2) Date: Jul. 9, 2020

(87) PCT Pub. No.: WO2019/141725
PCT Pub. Date: Jul. 25, 2019

(65) Prior Publication Data
US 2020/0400486 A1    Dec. 24, 2020

(30) Foreign Application Priority Data

Jan. 16, 2018 (EP) ..................................... 18151909

(51) Int. Cl.
*G01F 23/296* (2022.01)
*G01F 25/00* (2022.01)
(Continued)

(52) U.S. Cl.
CPC ............... *G01F 25/20* (2022.01); *B61D 5/00* (2013.01); *B61L 15/0081* (2013.01);
(Continued)

(58) Field of Classification Search
CPC ............ G01F 25/0061; G01F 23/2966; G01F 23/296; G01F 23/2962; G01F 23/284;
(Continued)

(56) References Cited

U.S. PATENT DOCUMENTS 5,042,298 A * 8/1991 Grein .................... G01F 23/296
73/290 V
6,006,868 A    12/1999 Klink
(Continued)

FOREIGN PATENT DOCUMENTS

DE    10201422693 A1    6/2016
DE    102016206770 A1    10/2017
(Continued)

OTHER PUBLICATIONS

Wikipedia: Tank Car: < https://en.wikipedia.org/w/index.php?title=Tank_car&oldid=814704551> retrieved by archive.org on Dec. 10, 2017. (Year: 2017).*
(Continued)

*Primary Examiner* — Jeffrey P Aiello
(74) *Attorney, Agent, or Firm* — Vorys, Sater, Seymour and Pease LLP

(57) ABSTRACT

The current invention relates to methods and systems for evaluating a filling state of a load bearing means by means of a monitoring system comprising a sensing module; said load bearing means adapted for being carried by a transport unit; said load bearing means comprising a loading space; said sensing module situated in proximity to said load bearing means and outside of said loading space; said sensing module comprising an emitter, a receiver, an evaluator and a memory comprising calibration data; said sensing module configured for carrying out a plurality of steps; wherein a spacing S between said emitter and said receiver does not exceed 200 mm; and wherein a maximum dimension M of said load bearing means is not smaller than 4 m.

16 Claims, 3 Drawing Sheets

(51) Int. Cl.
  *G01P 13/00* (2006.01)
  *B61L 15/00* (2006.01)
  *G01F 25/20* (2022.01)
  *B61D 5/00* (2006.01)
  *G01K 13/00* (2021.01)
  *G01P 15/00* (2006.01)
  *G01S 19/01* (2010.01)
  *H04B 1/02* (2006.01)
  *H04B 1/06* (2006.01)
  *H04B 7/185* (2006.01)

(52) U.S. Cl.
  CPC ......... *G01F 23/2966* (2013.01); *G01K 13/00* (2013.01); *G01P 13/00* (2013.01); *G01P 15/00* (2013.01); *G01S 19/01* (2013.01); *H04B 1/02* (2013.01); *H04B 1/06* (2013.01); *H04B 7/18578* (2013.01)

(58) Field of Classification Search
  CPC ......... G01F 15/063; G01F 25/00; B61D 5/00; B61L 15/0081; B61L 15/00; G01K 13/00; G01P 13/00; G01P 15/00; G01S 19/01; H04B 1/02; H04B 1/06; H04B 7/18578; H04B 7/185
  USPC .......... 367/99, 118; 702/1, 56, 85, 104, 127, 702/155–156
  See application file for complete search history.

(56) References Cited

U.S. PATENT DOCUMENTS

| | | | |
|---|---|---|---|
| 6,053,041 A * | 4/2000 | Sinha | G01F 23/28 340/621 |
| 6,246,154 B1 | 6/2001 | Gluszyk et al. | |
| 6,341,670 B1 | 1/2002 | Leblanc et al. | |
| 6,360,850 B1 | 3/2002 | Odisho et al. | |
| 7,454,972 B2 | 11/2008 | Heyman et al. | |
| 7,635,854 B1 * | 12/2009 | Babin | G01F 23/2928 250/573 |
| 10,092,683 B2 * | 10/2018 | Luckemeyer | A61M 1/90 |
| 2002/0195298 A1 | 12/2002 | Borugian | |
| 2006/0042386 A1 * | 3/2006 | Young | G01F 23/2966 73/579 |
| 2009/0212550 A1 * | 8/2009 | Albers | B60P 3/426 280/837 |
| 2011/0261652 A1 * | 10/2011 | Horsky | B06B 1/0253 367/97 |
| 2012/0222485 A1 | 9/2012 | Stickel | |
| 2013/0276529 A1 * | 10/2013 | Gerding | G01F 23/284 73/290 R |
| 2016/0116324 A1 * | 4/2016 | Job | G01F 23/0076 73/290 V |
| 2016/0153847 A1 * | 6/2016 | May | G01L 1/255 73/801 |
| 2016/0258803 A1 * | 9/2016 | Motomiya | G01F 23/2967 |
| 2017/0274916 A1 | 9/2017 | Nock et al. | |
| 2019/0146482 A1 * | 5/2019 | Celia | H04B 17/345 702/188 |

FOREIGN PATENT DOCUMENTS

| | | |
|---|---|---|
| EP | 0894994 A2 | 2/1999 |
| EP | 1148267 A2 | 10/2001 |
| EP | 1270983 A1 | 2/2003 |
| EP | 1798439 A1 | 6/2007 |
| EP | 2055982 A1 | 5/2009 |
| EP | 2196378 A1 | 6/2010 |
| EP | 2808223 A1 | 12/2014 |
| EP | 3003820 | 4/2016 |
| EP | 3017284 A1 | 5/2016 |
| WO | 2008153423 A1 | 12/2008 |
| WO | 2008156423 A1 | 12/2008 |
| WO | 2009118542 A1 | 10/2009 |
| WO | 2015071783 | 5/2015 |
| WO | 2016040430 | 3/2016 |
| WO | 2016069439 A1 | 5/2016 |
| WO | 2019141725 A1 | 7/2019 |

OTHER PUBLICATIONS

HC-SR04 Data Sheet: <https://web.archive.org/web/20170916020957/https://cdn.sparkfun.com/datasheets/Sensors/Proximity/HCSR04.pdf> retrieved by Archive.org on Sep. 16, 2017. (Year: 2017).*
ISR-WO for PCT/EP2019/051043 dated Apr. 23, 2019.

* cited by examiner

EVALUATION OF FILLING STATE IN CARGO TRANSPORT

TECHNICAL FIELD

The invention pertains to the technical field of evaluating the filling state of a load bearing means, for instance a cargo vessel belonging to a cargo wagon, or a container or tank container.

BACKGROUND

There remains a need in the art for an improved way of evaluating the filling state of a load bearing means.

U.S. Pat. No. 7,454,972 discloses a method and apparatus for acoustically weighing moving loads. A problem with U.S. Pat. No. 7,454,972 is its complexity in use.

EP 3 017 284 relates to solid borne sound wave phase delay comparison but does not disclose means for evaluating a filling state.

US 2012/0222485 discloses an ultrasound measurement system but lacks means for evaluating a filling state.

WO 2016/069439 discloses an ultrasound measurement system which can only be used for liquid cargo in a (closed) container, and is further hampered by the type of liquid.

U.S. Pat. No. 6,053,041 discloses a noninvasive measurement method for determining the level of the liquid/vapor interface, as such again limiting the use potential to situations where a liquid/vapor barrier is present.

The present invention aims to resolve at least some of the problems mentioned above.

SUMMARY OF THE INVENTION

The present invention provides methods and systems for determining the filling state of a load bearing means through evaluation of a reflected sound wave, in response to an emitted sound wave.

In a first aspect, the invention provides a method for evaluating a filling state of a load bearing means according to claim 1. In a more specific embodiment, the load bearing means is a cargo vessel belonging to a transport unit, said transport unit preferably being a wagon. In an even more specific embodiment, the invention is focused on land-based modes of cargo transport.

A key aspect of the invention is the possibility to sense the presence of load within the loading space without actually having access to the loading space. First, this is advantageous for safety reasons and procedural reasons, since opening the loading space may be undesirable, and automated sensing is in general faster than manual inspection of the loading space. This contrasts with the disclosure of U.S. Pat. No. 7,454,972, offering no possibility to evaluate the filling state without placing measurement means within the loading space. The invention provides an advantageous compactness, owing to the use of acoustic waves in a compact sensing module, whereby the spacing between emitter and receiver does not exceed 200 mm. This leads to a small footprint, which is more robust and less prone to physical damage in rough environments such as cargo transport.

Furthermore, the invention may be particularly beneficial in the case where the load bearing means does not belong to the transport unit and is operated by a party different from the party operating the transport unit. For instance, a cargo wagon operated by a first party may carry a container operated by a second party. In such cases, the measurement of the filling state may contribute to an improved service from the first party to the second party, and does not involve any direct contact with the load bearing means, which may be important for safety, efficiency of transfer of the load bearing means, and overall liability. Additionally, the solution provided by this invention is generic with respect to the load bearing means, i.e. swapping load bearing means (e.g. containers) can be done easily with a software reconfiguration, preferably fully automated reconfiguration, without requiring physical alterations to the monitoring system. Similarly, the invention advantageously allows an operator of releasably mountable load bearing means such as for instance intermodal containers or tank containers, to evaluate the filling state of its (tank) containers without requiring software interfaces or related special agreements with the party operating the transport units carrying the load bearing means.

Finally, the present invention provides for a generic way of measurement, exhibiting high reliability and robustness, based on known physical phenomena relating to sound wave reflection. Hereby, a solid borne sound wave may travel through the surface of the load bearing means via a "surface wave", which is to be distinguished from the wave travelling through the load if the loading space is filled, resulting in a "volume wave", traveling at different speed and exhibiting different properties. Moreover, if a transport unit is present, a third contribution to the reflected sound wave may come from portions of the transport unit that do not belong to the load bearing means, such as the chassis of the transport unit, whereby the mechanical force exercised on these portions leads to modulations of the reflected sound wave. Hereby, the combination of these contributions leads to a particular modulation of the reflected sound wave, allowing robust discriminating between the sound wave associated with the filled state and that of the unfilled state.

One of the most important features that differentiates the invention further from certain prior art methods, is that it is far more flexible to use, and does not greatly restrict the situations where it can be implemented, given the context of the invention, namely that of large-scale cargo transport in all forms. Many systems use acoustics or vibrations to find the liquid/vapor surface, or can only measure whether or not the liquid level is over a certain position (where the acoustic or vibrational emitter and/or receiver are positioned on the vessel), thus effectively limiting the usability to (closed container) liquid cargo transport. The invention at hand allows filling state assessment for any type of cargo and any type of vessel, without prejudice to shape of the vessel or the position where the sensor module is to be positioned.

In a second aspect, the present invention provides a monitoring system for evaluating a filling state of a load bearing means according to claim 13.

In a further aspect, the present invention provides a transport unit according to claim 14, said transport unit comprising a monitoring system for evaluating a filling state of a load bearing means.

According to yet another aspect, the invention offers a kit for evaluating a filling state of a load bearing means according to claim 15. The advantage of said kit lies in its advantageous combination of a sensing module for local measurements with a monitoring module for transmitting these measurements to a remote location.

Further aspects, preferred embodiments and their advantages are discussed in the detailed description and in the dependent claims. It is to be noted that any and all further features discussed as part of the method apply to the products (kit, transport unit, monitoring system) described in this document and vice versa.

DETAILED DESCRIPTION OF THE INVENTION

Figure 1:
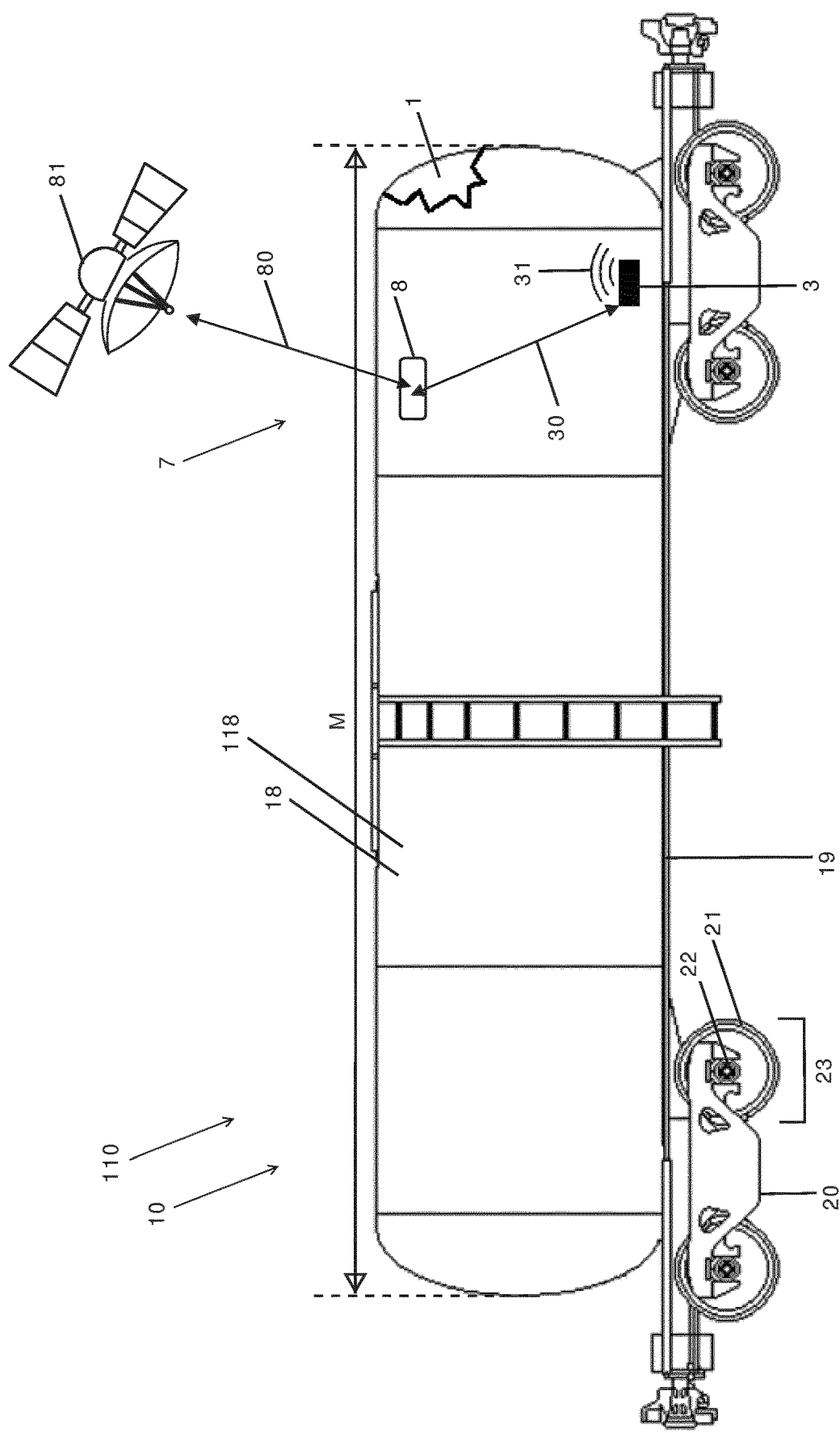
FIG. 1 shows a first example embodiment of a transport unit according to the present invention.

It should be pointed out that the term "vessel" or "cargo vessel" as used in this document does not in any way means to restrict the load bearing means to nautical transport, and is meant as a generic term for a holder or container (although this term will be reserved for more specific forms of a vessel in this document) for holding objects, whereby said objects may be of any state of matter (solid, liquid, gas and/or plasma) and any size or shape (granular or particulate material, liquids, gas, block materials, consumer goods, industrial tools (cranes, vehicles, machinery, etc.), break bulk cargo or industrial materials (half-fabricates, fabricates, raw materials, etc.)). As such, the vessel can simply be a supporting surface on which solid objects are placed and held (such as a trailer or semi-trailer, flat cars or flat wagons), but can also be a (closed) tank container, an open wagon, box cars or covered wagons, well wagons, hopper wagons, etc.

The above definition also better reflects the exact scope of the invention, in that it is not limited to verifying whether a container of some kind is 'full' of liquid (or granular material with substantially small particles, such as sand or grain) up to a certain level (as is the case in WO 2008/156423 where the liquid level of a septic tank is measured, in particular whether the liquid level has surpassed a certain height at which the sensor is placed). The method of the invention is capable of assessing the filling state (i.e. at the very least whether the container is fully empty or not, and allows, over longer time periods of measurements, to even assess a—approximated—quantification of the filling state) of any load bearing means as discussed above, regardless of the position of the sensing module, the type of load, or the type of load bearing means.

Furthermore, it is to be noted that the way the cargo is being held in the cargo vessel is of no importance, as the cargo can be singular units that are simply stacked on a flatbed, or can be bulk cargo, like granular material, in a container essentially behaving like a liquid. The only requirement is that the cargo is supported by the cargo vessel in any way (whether it is via side walls, via a bottom or top plate), as this is how the cargo influences the cargo vessel, which is detected by the method and system at hand.

The term "cargo wagon" refers to a (mobile) transport unit which comprises a cargo bearing means or cargo vessel (again, without limitation to the shape of said vessel), such as a rail cargo wagon, or a (semi-) trailer with or without a 'tractor unit'. Examples of such cargo vessels have been described above.

The term "transport unit" refers to a means of transporting cargo in a load bearing means or cargo vessel, whereby the cargo vessel can be a fundamental part of the transport unit (as in, not intended to be removable in practice, like a cargo wagon as described above) or a transitional part of the transport unit (intended to be removable fixable or mountable). Examples of the former can be a flatbed trailer in cases where the cargo is simply placed on the flatbed, a hopper car or hopper wagon; examples of the latter can be flatbed trailers where containers holding the cargo are placed/mounted on the flatbed, well cars or well wagons (where intermodal containers are carried).

In a first aspect, the invention provides a method for evaluating a filling state of a load bearing means according to claim 1.

In a preferred embodiment, the step of evaluating the filling state indicative of the loading space is at least partly based on a comparison of the frequency spectrum of the reflected sound wave to the calibration data. In a further preferred embodiment, the step of evaluating the filling state indicative of the loading space is at least partly based on a comparison of a detected resonant frequency or natural frequency of the load bearing means (cargo vessel) to the calibration data.

In a preferred embodiment, the evaluator is further configured for extracting a frequency spectrum of the reflected sound wave and/or extracting a resonant frequency (whereby said parameters can be extracted from the reflected signal); wherein evaluating the filling state is based on at least comparing said frequency spectrum and/or resonant frequency to the calibration data. Based on the frequency spectrum and/or the resonant frequency of the reflected sound wave, a comparison can be made to the calibration data, ideally holding a value for the corresponding indicator (s) above, upon which comparison conclusions can be made on the filling state of the cargo vessel, and even potentially resulting in an approximation of the actual filling level.

The resonant frequency can be determined for instance by emitting a sound wave with components over a broad frequency band, where the frequency spectrum of the response to said emitted sound wave can be analyzed to determine the resonant frequency (or at the very least, the shift of said resonant frequency). Note that such a broad band sound wave can be easily accomplished by many types of actuation (for instance a pin 'tapping' the cargo vessel, or its support/transport unit) as such general actuator signals will comprise components in a broad frequency band. It should be pointed out that the proposed method allows the sensing module to be positioned anywhere on the load bearing means or cargo vessel, or even on a chassis or support on which the cargo vessel is mounted, since in each case, a different filling state will result in a different resonant frequency. None of the prior art systems discloses a system that actually uses the frequency information of the response to assess the filling state. Specifically, amplitude and/or phase shift are taken into account in the known prior art, which parameters cannot be used reliably to assess the filling state quantitatively (amplitude and phase shift will be strongly influenced by a number of parameters which can vary despite an actually constant filling state, amongst which the spatial distribution of cargo), which quantitative assessment is a further objective of the invention at hand.

A further advantage is that the method (and any system for performing the method) is thus not dependent on the type of cargo, as there is no interaction with an interface (as in WO 2016/069439), or dependence upon the position of the cargo (as in WO 2008/156423), since only the load the cargo exerts on the cargo vessel (and optionally its transport unit) influences the reflected sound wave, which is the response to the emitted sound wave. Note that the method and system of the latter document is only applicable to liquid cargo, as it seems to rely on contact of the cargo with the wall of the septic tank at the position where the sensor is mounted. In case of solid cargo, especially in unit transport, this is seldom the case.

In one embodiment, the filling state may relate to two possible states, the filling state either being filled or unfilled. In another embodiment, the filling state may relate to three possible states, the filing state either being filled, unfilled or undecided. In yet another embodiment, the filling state may take on a discrete number of different filling levels larger than 2, e.g. 3, 5, more than 5, 10, more than 10, 100, more than 100. In a further preferred embodiment, the filling state may additionally take on state relating to a releasably mountable load bearing means not being mounted on the transport unit. In particular, as will be discussed further on, the invention allows for a self-improving assessment of filling state. Every time the filling state is measured, the reflected sound wave (or the results of analysis of the reflected sound wave), can be logged (for instance in one or more central server). If at a later point (or directly subsequent or preceding to the measurement), the filling state is effectively checked (for instance upon delivery) which can also be logged and coupled to the reflected sound wave, as such giving more and more data points for future filling state evaluation, allowing more accurate estimations of the filling state. Even without actual checks of the filling state that are coupled to filling state assessments via the sensing module, future evaluations can be improved by feeding the data into machine learning models, as is discussed further on in the application.

In one embodiment, the load bearing means belongs to a transport unit that is a cargo wagon or a related vehicle for transport over rail, and the load bearing means is a cargo vessel that is permanently attached to said cargo wagon. In such a case, the sensing module and preferably the entire monitoring system may be mounted on the load bearing means outside of said loading space. Alternatively, at least the sensing module may be mounted on another portion of the transport unit, said portion not belonging to the load bearing means, such as the chassis of the transport unit. Both variations have their own particular merits. For instance, mounting the sensing module on the load bearing means/ cargo vessel itself, allows for a more structural identification for measurements/registrations by the sensing module of the cargo vessel it is mounted on. For instance, if the cargo vessel is moved from a first transport unit to another (or simply placed on or removed from a transport unit), the sensing module will remain in place, which simplifies the accounting of the filling state via the associated monitoring system. Furthermore, no new sensing module (nor new monitoring system) would need to be provided to the cargo vessel during such a switch of transport unit.

In the alternative, placing the sensing module on another portion of the transport unit, not on the cargo vessel, can provide a safer position for the sensing module, as cargo transport often experiences extreme environments (heat, cold, moisture, chemical products, mechanical stress, etc.). While the cargo vessel is often exposed to elements, the transport unit itself (meaning the chassis or similar portions) comprises better shielded sections on which the sensing module can be placed. Given that calibration is important, it is advantageous that the sensing module remains protected from outside influences that can bring temporary or lasting changes to its functioning.

In another embodiment, said loading bearing means is a releasably mountable load bearing means, such as a container or a tank container, preferably suitable for intermodal transport, and the sensing module and preferably the entire monitoring system may be mounted on said releasably mountable load bearing means. In some related embodiments, the releasably mountable load bearing means may be releasably mounted on a suitable transport unit such as an intermodal cargo wagon comprising a chassis.

In such an embodiment, the sensing module and preferably the entire monitoring system may either be mounted on the releasably mountable transport unit or it may be mounted on said portion preferably belonging to said chassis.

In each of these embodiments, said maximum dimension (M) of said load bearing means (18), preferably said length (M) of said load bearing means (18), is not smaller than 4 m, more preferably not smaller than 5 m, most preferably not smaller than 6 m. This amounts to the sizes of typical cargo vessels being larger than 4 m, or the typical standard sizes of containers or tank containers, e.g. 20 feet or 6096 mm. In an alternative embodiment, said maximum dimension of said load bearing means (18), preferably said length (M) of said load bearing means (18), is larger than 1 m and/or smaller than 4 m, more preferably, larger than 2 m and/or smaller than 3 m.

Hereby, several physical phenomena may contribute to the reflected sound wave. First, a solid borne sound wave may travel through the surface of the load bearing means, e.g. the outer surface of the cargo vessel. This corresponds to a "surface wave", which may undergo significant modification due to the presence of a load within the loading space. This modification may be due in part to damping of the reverberation of the outer surface due to contact with the load present in the loading space. Another cause of this modification may be the mechanical force exercised on the outer surface due to the weight of the load. This mechanically-induced type of modification is also at the basis of the monitoring mechanism disclosed in US 2016/0153847, which is incorporated by reference. Apart from the surface wave, second, the emitted sound wave may travel through the load if the loading space is filled, resulting in a "volume wave" that contributes to the eventual reflected sound wave. As is well-known for e.g. seismic waves, volume waves and surface waves travel at different speeds and exhibit different properties, and hence contribute to different segments of the amplitude envelope of the reflected sound wave, typically with activity on different frequency bands. Another and third contribution to the reflected sound wave may come from portions of the transport unit not belonging to the load bearing means, such as the chassis of the transport unit. This corresponds to a third form of wave, which is of importance particularly in an embodiment where the sensing module is mounted on the transport unit and not on the load bearing means, e.g. mounted on the chassis. Indeed, the chassis itself may carry and reflect the emitted sound wave, whereby the mechanical force exercised on the chassis due to the weight of the load may lead to a modification of the reflected sound wave. This again relates to the mechanically-induced type of modification of US 2016/0153847; however, in this case it is not the load bearing means but the chassis that is the medium carrying the sound wave.

In the context of the present invention, the monitoring system concerns all devices and circuitry physically attached to transport unit. The monitoring system may communicate with a device that is external to the rail wagon. Examples of such an "external device" are a remote server, e.g., for remote monitoring, and a read-out device, e.g., for receiving data collected by the monitoring system. Such a server may collect data from each filling state assessment, preferably coupled with further data, for instance any one or more of the following: characteristics of cargo (type, etc.), characteristics on the cargo vessel (and transport unit), temperature data, time stamp, physical assessments of the filling state (for instance upon arrival). Such data can be used to draw up predictive models for a cargo vessel, allowing more accurate filling state assessments over time. This is especially noteworthy since a cargo vessel will typically be used for the transport of a single good (for instance coal, corn, petrol) or a single type of goods (such as grains in general). This practical limitation allows the predictive model to be far more accurate, as the type of cargo varies very little, which will result in the assessments of the filling state all falling under a singular general model for a specific (type of) cargo vessel.

In the context of the present invention, the term "GNSS" refers to a global navigation satellite system, such as GPS, GLONASS, Galileo, BeiDou, etc.

In this document, the reflected sound wave is described as comprising an amplitude envelope over time, which is equivalent to the average power carried over per time unit. Hereby, time may be split in segments, and the power carried by the signal may be averaged over several time periods. This is to be distinguished from the frequency spectrum of the sound wave, which relates to activity at distinct frequencies. Hereby, the frequency spectrum may be split in frequency bands, and activity may be averaged over certain intervals in time, preferably combined with an averaging over a pre-defined time period.

According to several aspects set out in the summary section, the present invention provides a method, a system, a transport unit, a kit, and a use. One of ordinary skill in the art will appreciate that the system may be configured to execute steps which are equivalent to the steps comprised in the method. One of ordinary skill in the art will furthermore appreciate that the system and the transport unit according to the present invention are equipped so as to enable execution of the method according to the present invention. Therefore, in this document, no distinction is made between the different aspects of the present invention, and each element of the disclosure may relate to each of the different aspects of the present invention.

According to a preferred embodiment, said calibration data (13) comprises at least one measurement relating to reflection data of said loading space (1). This is advantageous because it allows evaluation on a fully custom basis, whereby the unique features of a given loading space with its current interior fittings, configuration and wear level etc. may be taken into account. To this end, in a preferred embodiment, a separate configuration step preceding said method is carried out. Related, in a preferred embodiment, the monitoring system comprises means for carrying out said configuration.

According to a preferred embodiment, said sensing module is mounted on said load bearing means outside of said loading space; wherein said loading bearing means is a cargo vessel that comprises said sensing module and belongs to a transport unit being a cargo wagon. This embodiment may or may not correspond to a cargo vessel being permanently attached, e.g. by welding, to a chassis comprised in said transport unit. Such an embodiment advantageously uses the given that the load bearing means need not be swappable across transport units. An embodiment with the sensing module mounted on the load bearing means, e.g., mounted on the cargo vessel, may provide the advantage of direct contact with the surface surrounding the loading space. Such an embodiment may allow for a reflected sound wave with relatively high amplitude and hence a reflected signal with high signal to noise ratio, allowing a reliable evaluation of whether the loading space is filled or not. In other words, by mounting the sensing module on the load bearing means, the acoustic path between the sensing module and the loading space is minimized. This may correspond to a reflected sound wave that primarily comprises said surface waves and said volume waves, allowing robust evaluation of the filling state. In an alternative embodiment wherein the load bearing means is an integral part of the transport unit, the sensing module may also be mounted on a portion of the transport unit but not on the load bearing means, for instance on said chassis.

In another embodiment, said sensing module is mounted on said load bearing means outside of said loading space; wherein said load bearing means is a releasably mountable load bearing means, preferably a container or tank container, that comprises said sensing module. Such an embodiment is suitable for a setup wherein the load bearing means is swappable across transport units. Particularly, it allows an operator of releasably mountable load bearing means such as for instance intermodal containers or tank containers, to evaluate the filling state of its (tank) containers without requiring software interfaces or related special agreements with the party operating the transport units carrying the load bearing means.

In yet another embodiment, said sensing module is mounted on a portion of said transport unit not belonging to said load bearing means; wherein said transport unit is a cargo wagon (210), preferably an intermodal cargo wagon, comprising a chassis suitable for carrying said load bearing means, said load bearing means preferably being a releasably attached load bearing means, more preferably a container or a tank container; wherein said portion on which said sensing module is mounted preferably belongs to said chassis. Also this embodiment is suitable for a setup wherein the load bearing means is swappable across transport units. By mounting the sensing module on a portion of the transport unit different from the load bearing means, the sensing module may primarily pick up reflected sound waves that are modulated by the mechanical force exercised on this portion due to e.g. the weight and/or the volume of the load, if present. By mounting the sensing module for instance on the chassis, a solid contact with the transport unit is ensured at an appropriate location, which is fully exposed to said mechanical force, allowing for reliable filling state evaluation.

In a preferred embodiment, said sensing module further comprises a comparator, wherein said method comprises the additional step of comparing an emitted signal converted from said emitted sound wave received from said emitter and said reflected signal received from said receiver by means of said comparator, generating a comparison signal based thereon; and wherein said step of evaluating said filling state is further based on said comparison signal. Hereby, it is to be noted that the evaluating may or may not be based only indirectly on the reflected signal. In an embodiment where the evaluating is based only indirectly on the reflected signal, the evaluator may base its calculations on the calibration data and the comparison signal without taking into account the reflected signal directly. In another embodiment, the evaluating is based directly on the calibration data, the reflected signal as well as the comparison signal.

In a preferred embodiment, said evaluator is further configured for extracting a frequency-related indicator associated with at least one frequency band from said reflected signal and/or optionally from said comparison signal and comparing said frequency-related indicator to a value comprised in said calibration data. Such an embodiment advantageously utilizes the acoustic resonance characteristics of the transport unit. Particularly, since the presence of a load in the loading space typically results in a shift of the natural frequencies of the load bearing means and, related, of the chassis and/or other portions of the transport unit, it is advantageous to monitor at least one of these natural frequencies and detect a shift of this frequency. In a further preferred embodiment, this is enabled by a normalization step wherein the amplitude of the reflected signal and/or the comparator signal is normalized with respect to a reference amplitude level present in the calibration data. This normalization is preferably preceded, succeeded or combined by a frequency band filtering, whereby the measurement data of one or more frequency bands characteristic of the reflection, e.g. pre-determined frequency bands comprised in the calibration data and relating to natural frequencies, is filtered out and is further processed so as to allow an accurate comparison with calibration data. Related to this, since the presence of a load may have a damping effect on resonance, the shape of the frequency spectrum, associated with a certain frequency band, may be an alternative or additional frequency-related indicator.

In a preferred embodiment wherein said sensing module further comprises said comparator, said comparator is further configured for comparing a phase of said emitted signal to the phase of said reflected signal, said evaluating by means of said evaluator is based at on said calibration data, said reflected signal and said comparison signal; and said evaluating comprises extracting a phase-related indicator associated with said comparison signal and comparing said phase-related indicator to a value comprised in said calibration data. Such an embodiment advantageously takes into account phase delay information. This information may be particularly important where the load of the transport unit impacts the propagation speed of the sound waves, leading to impact on the phase, whereby the impact may be particularly strong in certain frequency bands and less pronounced or absent in other frequency bands. Hence, in a further preferred embodiment, the phase is compared and evaluated with respect to one, two, three or more frequency bands which are preferably pre-determined.

According to yet another embodiment, said memory further comprises at least one parameter relating to the application of a machine learning model to said calibration data; wherein said evaluator is further configured for updating said at least one parameter for training said machine learning model; wherein said evaluator is further configured for evaluating said filling state based on said at least one parameter relating to said machine learning model; and wherein said sensing module is preferably self-calibrating. Such an embodiment advantageously combines the physical-electronic interface inherent to the invention with advanced processing of the measurement data. Since the combination of surface waves, volume waves and waves modulated by mechanical force leads to a particular reflected sound wave, robust discriminating between the sound wave associated with the filled state and that of the unfilled state is possible both manually as well as in an automated fashion. To enable automated evaluation, preferably having a binary output (filled vs. unfilled) or a ternary output (filled vs. unfilled vs. undecided), a variety of machine learning models, preferably classifier models, may be used. Likewise, an output with a discrete number of different filling levels, e.g. 3, 5, more than 5, 10, more than 10, 100, more than 100, may be considered. The machine learning model may include any or any combination of the following: a linear or quadratic classifier, logistic regression, support vector machines; k-nearest neighbor; boosting; a decision-tree-based technique such as random forests; neural networks; learning vector quantization.

Said machine learning models may operate in an offline mode, with training done beforehand on a pre-defined training set. On the other hand, the models may be trained online and/or in real-time, learning from new measurements as they become available. Hereby, the training may be fully unsupervised but may be partially or fully supervised. Manual and/or automated configuration may be performed at least partly remotely by means of a communication channel between said monitoring system and a remote server. It may also be done locally, e.g. by having an operator provide manual input to the sensing module with respect to the current filling state. This may be done by means of a read-out device or a local terminal connecting wirelessly or wired to the monitoring system. This may also be done by a simple button or other manual interface on the monitoring system, allowing an operator to indicate the current filling state or a change in the filling state. Such manual operations may be associated with a training phase followed by a typically much longer operational phase without manual intervention. Hereby, a periodic schedule, an event-driven schedule or a manual maintenance-related request by an operator may trigger the transition from training phase to operational phase and vice versa.

In one embodiment, the monitoring system comprises a visual indicator of the currently calculated filling state, e.g. a LED present on the sensing module, and/or a manual operator input means such as a dedicated button. Such a visual indicator may facilitate an operator in performing maintenance of the monitoring system, whereas a manual operator input means may allow creating an alert by a local operator. In a related embodiment that may be combined herewith, the monitoring system delivers a notification comprising the currently calculated filling state and/or manual operator input to a remote server. Apart from providing the main advantages of remote monitoring, such a notification may additionally facilitate a remote operator in the maintenance of the monitoring system.

In a related preferred embodiment, said sensing module comprises a battery or equivalent power source; wherein said sensing module comprises a sensing-module-related wireless interface for transmitting notifications; and wherein the method comprises the additional step of transmitting a notification comprising said filling state via said sensing-module-related wireless interface. Hereby, an equivalent power source may relate to an energy harvesting means, e.g. a means that converts the mechanical energy of the motion of the transport unit and/or seismic motion and/or mechanical vibrations relating to the motion of the transport unit into electrical energy. This is advantageous since it avoids the disadvantages of wiring the monitoring system. Such wires can be easily thorn and hence, such a wireless design leads to practical advantages and more robust operation. Moreover, such an embodiment is particularly suitable for unpowered cargo wagons, which do not offer any form of power source.

In another related embodiment, said monitoring system further comprises a monitoring module; wherein said monitoring module comprises a first connection means, preferably a short-range wireless interface, for receiving said notification from said sensing module transmitted via said wireless interface; and wherein said monitoring module comprises a second connection means, preferably a satellite communication interface; and wherein said method comprises the additional step of transmitting said filling state to a remote server via said first and second connection means. The short-range wireless interface preferably complies with standards such as Bluetooth, Zigbee, DECT, NFC and other related radio technologies. The satellite communication interface may relate to a cellular network standard such as 3G, 4G, 5G and/or a low-power wide-area network (LP-WAN) standard relating to Internet of Things, such as LoRa, Sigfox, Telensa, NB-IoT, Nwave, and Weightless.

In a preferred embodiment of the invention, the emitter is an actuator comprising a pin that is accelerated towards said load bearing means outside of said loading space or towards a portion of the transport unit outside of said loading space. The emitter hence represents a mechanical principle based wave emitter. At impact, the mechanical energy from the moving pin, which for instance is a hardened steel item, is transferred into the transport unit. A shock wave resulting from the impact is transmitted in all directions within the transport unit. This leads to a reflected sound wave, carrying information with respect to the filling state of the transport unit. This emitter design entails a physical contact between the emitter and an appropriate part of the load bearing means or the transport unit. In a preferred embodiment wherein the transport unit is a cargo wagon and the load bearing means is a cargo vessel belonging to said cargo wagon, the emitter, and hence the entire sensing module, may be mounted preferably on said cargo vessel, or, alternatively, on the chassis of said cargo wagon.

In an alternative embodiment, the emitter is an actuator as can be found in smartphones to produce its vibration, namely via a motor which spins an off-center weight at a high rotational speed, producing a vibration. Of course, similar components may be used to provide this effect.

In another preferred embodiment, said sensing module comprises a length L and a height H, said length L and height H both not exceeding 200 mm, said height preferably not exceeding 100 mm. This has the advantage of a compact design, leading to less risk of damage due to external factors, and hence increased reliability.

In one embodiment, the monitoring system comprises a global navigation satellite system (GNSS) receiver, such as a GPS receiver or an equivalent means. In an embodiment, the monitoring system comprises an accelerometer. In an embodiment, the monitoring system comprises a temperature measurement means positioned for measuring ambient temperature outside of the load bearing means and/or surface temperature of the load bearing means. In an embodiment, the monitoring system comprises two or three of the above (GNSS receiver, accelerometer, temperature measurement means). Hereby the GNSS receiver may be comprised in the sensing module but is preferably comprised in another part of the monitoring system, such as the monitoring module (if present). The presence of a GNSS receiver has the advantage that the load of which the filling state is determined may be localized remotely. Another advantage is that the location of the transport unit may be tracked over time on a load-carrying basis, for instance initiating a new measurement session of the location whenever the filling state changes from unfilled to filled, and terminating the measurement session when the filling state changes from filled to unfilled. This also allows insights with respect to the number of events on a given stopping location. Hereby, a single event may correspond to either loading or unloading, and two events may correspond to the combined unloading of a current load and loading a new load. The accelerometer may be comprised in any part of the monitoring system, such as the monitoring module, but is preferably comprised in the sensing module. The accelerometer may allow detecting movement and the intensity of movement, which is useful because movement may result in movement of the load if a load is present, and hence deviations in the measurements of reflected sound waves. This may result in an unstable system state as detected, which is undesirable. Hence, preferably the monitoring system takes into account measurements of the accelerometer for maintaining a filling state also in periods of sudden change of external circumstances. Furthermore, note that the GNSS receiver and the accelerometer may be advantageously combined to provide for a more accurate location determination. Finally, the presence of a temperature measurement means such as a simple electronic thermometer, preferably comprised in said sensing module, allows to compensate for the impact of temperature deviations on the reflected sound waves. It is well known that the acoustic properties of structural parts such as metal parts, typically prominently used in cargo vessels (and chassis) since structural strength is crucial, may be impacted by temperature changes. Preferably, the evaluator takes into account measurements of said temperature measurement means to compensate for these changes, yielding a more robust evaluation. Taking into account the temperature measurements may entail applying a correction to the characteristics that are determined for the reflected sound wave (frequency, phase shift, amplitude), applying a larger error margin when comparing to the calibration data and/or storing the temperature measurement along with the reflected sound wave (and/or its characteristics) in a database.

According to another embodiment of the invention, the emitter comprises a dipole sound wave generator being adapted to generate a solid borne sound wave having a directional pattern with respect to the load bearing means.

According to another embodiment of the invention, the sensing module comprises more than one emitter and/or one or more receiver, for instance 2 emitters, more than 2, 3, 4 or 5 emitters, or for instance 2 receivers, more than 2, 3, 4 or 5 receivers. At the emitter side, this may be advantageous as an array of emitters may yield an emitted sound wave with more directionality, which may lead to more focused monitoring of the loading space. Hereby, the spacing S between emitter and receiver may correspond to the maximal distance between any emitter and any receiver. At the receiver side, this may lead to higher sensitivity, as an array of receivers may allow to cancel noise across measurements and attain a higher signal to noise ratio for the reflected signal.

In yet another embodiment, the monitoring system comprises more than one sensing module, for instance 2, more than 2, 3, 4 or 5 modules. In such an implementation, the monitoring module may receive signals from all sensing modules and may verify whether the sensing modules provide for consistent results. Hereby, again, the spacing S between emitter and receiver may correspond to the maximal distance between any of the emitters and any of the receivers. If an inconsistency is detecting, with e.g. one sensing module indicating a filled state and two sensing modules indicating an unfilled state, the monitoring module may send an alert to a remote server relating to this inconsistency and/or may determine a filling state from all signals, e.g. by setting the filling state to the state for which the largest number of sensing modules provides an indication.

According to yet another embodiment of the invention, the emitter comprises a controlling unit being adapted to generate a sound wave generating controlling signal, which sound wave generating controlling signal forms a base for the emitted sound wave. For example, the sound wave generating controlling signal may be an analogue or digitized signal. The sound wave controlling signal may trigger the emitted sound wave. Therefore the sound wave generating controlling signal may be generated by the emitter such that the sound wave generating controlling signal may as well be called emitter-controlling signal. According to another embodiment of the invention, the emitter comprises an electro-acoustic converter being adapted to convert the sound wave generating controlling signal into an acoustic signal, wherein the emitter is adapted to couple the acoustic wave into the transport unit. An electro-acoustic converter can be a loudspeaker, for example. Other means for converting electrical signals into acoustic waves are also possible. The electro-acoustic converter is placed near or on the surface of the transport unit such that the converted or acoustic signal can be introduced into the transport unit. Within the test object the acoustic wave, which is then also called emitted sound wave, is propagated or travels in different directions. The propagation of the sound wave within the transport unit is dependent on the physical properties of the transport unit and, importantly, on the presence of a load in the loading space.

In an embodiment where mechanical principles are used to generate and to detect sound waves, such as an embodiment wherein the emitter is an actuator, any material that has a relative high density can be used for the receiver. These are for example ceramics, ferro-magnetic metals, metals that have no ferro-magnetic properties, etc.

According to another embodiment of the invention, the emitter comprises an electro-magnetic converter being adapted to convert the sound wave generating controlling signal into a magnetic wave, wherein the emitter is adapted to couple the magnetic wave into the transport unit so as to generate the sound wave within the transport unit. A magnetic wave can for example be provided by a DC electrically powered inductor or an AC electrically powered inductor. The electro-magnetic converter is placed near or on the surface of the transport unit such that the emitter can introduce the converted or magnetic wave into the transport unit. Within the transport unit the magnetic wave may generate a sound wave due to physical effects. Again, the propagation of such a sound wave within the transport unit is dependent on the physical properties of the transport unit and, importantly, on the presence of a load in the loading space.

In an embodiment where magnetic principles are used to generate and/or detect sound waves, the emitter and receiver can consist of any metal that has magnetic properties. Hereby, it is not necessary that the transport unit, or the outer surface on which the sensing module is mounted, has any magnetic retention properties. This allows using a very wide range of ferro-magnetic materials; basically anything a permanent magnet sticks to is possible.

In a preferred embodiment, the receiver, which is comprised in the sensing module which is mounted on the transport unit, does not have to touch the transport unit directly. In a related embodiment, the complete sensing module need not touch the transport unit directly. In this sense, the monitoring system can be considered as a partially or full non-contact sensing technology. This sensing technology can measure the mechanical forces even when the outer surface of the transport unit is covered in a paint-coat of any type. This sensing technology may also work correctly even when the transport unit is covered in a coat of rust.

According to yet another embodiment of the invention, the controlling unit is adapted to generate a continuous sound wave generating controlling signal. The continuous sound wave controlling signal may have a certain intensity level which is constant in time. According to another embodiment of the invention, the controlling unit is adapted to generate a pulsed sound wave generating controlling signal. Instead of a continuous sound wave, a single burst wave, for example a pulse burst wave can be used. The signal intensity for a pulsed wave can be very high with respect to the signal intensity of a continuous wave. However, the pulsed sound wave may have an overall energy consumption which may be lower than that for a continuous sound wave. This is due to a short signal pulse with a longer pause afterwards wherein during the pause the intensity of the sound wave is very low or even zero. Since the pulsed sound wave has a higher energy transfer at a distinct time it also allows to increase the spacing or gap between the sensing module and the load bearing means. This is advantageous particularly if the sensing module is not mounted directly on the load bearing means but on some (other) part of the transport unit, such as the chassis.

As the distance between the emitter and the receiver directly impacts the evaluation, it is preferred to place the sensing devices, e. g. the emitter and the receiver, in one and the same housing belonging to and surrounding the sensing module. A change of the distance between the emitter and the receiver may for instance directly influence the signal phase delay time. The larger the distance between the emitter and the receiver, the larger the signal phase delay may become. To avoid complicated and probably costly compensation methods, it is preferred to avoid that the spacing or distance between emitter and receiver can change during the operation of the sensor system. This can be achieved by an appropriate design.

In a preferred embodiment, said transport unit is an unpowered transport unit or unpowered rail wagon, more preferably a cargo or tank rail unit. Unpowered rail wagons are generally cargo or tank rail wagons, or other suitable railway wagons used for the carrying of cargo on a rail transport system which, when coupled together and hauled by one or more locomotives, form a train. This type of rail wagons is also referred to as railway wagons, goods wagons, freight wagons, freight cars, etc. These units comprise a chassis with which the unpowered transport unit is loosely laid on different stand-alone entities consisting of one axle and a pair of wheels, also referred to as wheelsets. Such a wheelset is the assembly of the wheels connected by an axle of a railway wagon rolling on the railway track. In most cases railway wagons have two bogies, each comprising two or three wheelsets. These bogies or trucks form a frame assembly beneath each end of the railway wagon which holds the wheelsets and allows for rotation around a generally vertical axis of rotation with respect to the railway wagon. However, it is possible, for example with short freight cars, to mount the wheelsets without bogies, for example two wheelsets at both ends of such a short freight car directly mounted to the railway wagon chassis. Such transport units, which are unpowered railway vehicles lack any form of on-board propulsion and often lack any form of power supply.

In a preferred embodiment, the evaluated filling state and/or data measured by the sensing module is combined with a timestamp and optionally, if GNNS means are available, further with a location stamp and this sensing information is carried over from the sensing module to the monitoring module and stored there for transmission to a remote server. Additionally, preferably, said sensing information is stored in the memory of the sensing module for further use, e.g. as input for the machine learning model. In an alternative embodiment, said sensing information is stored at the sensing module and is accumulated until it is read out by means of a read-out device that is suitable to communicate with said sensing module via a short-range wireless communication protocol such as Bluetooth or Zigbee. In another alternative embodiment, said sensing information is stored at the sensing module and is sent to a remote server directly, via a long-range communication network such as a satellite communication network and/or a cellular data network such as a network complying with 3G, 4G, 5G or higher. In all embodiments, the trigger for both sensing and sending of sensing data may either be based on a periodic schedule, may be triggered by a schedule based on a change of the filling state or of the location, or may be based on a combination of these schedules.

In a preferred embodiment, the emitted sound wave comprises audible frequencies, operating in a frequency band that at least partially overlaps with the frequency band audible by humans. In an alternative embodiment, the emitter operates completely in the infrasonic or the ultrasonic frequency band, e.g. solely at frequencies below 20 Hz, more preferably below 10 Hz, or solely at frequencies above 20 kHz, more preferably at frequencies above 22 kHz. In yet another embodiment, a combination of these bands can be devised, e.g. the frequency band with frequencies between 0 and 18 Hz or between 22 and 24 kHz.

In a further aspect, the invention provides a use of a monitoring system according to claim 13 in a method according to claims 1-12.

The invention is further described by the following non-limiting examples which further illustrate the invention, and are not intended to, nor should they be interpreted to, limit the scope of the invention.

EXAMPLES

Example 1: Two Example Embodiments of Transport Units

Figure 2:
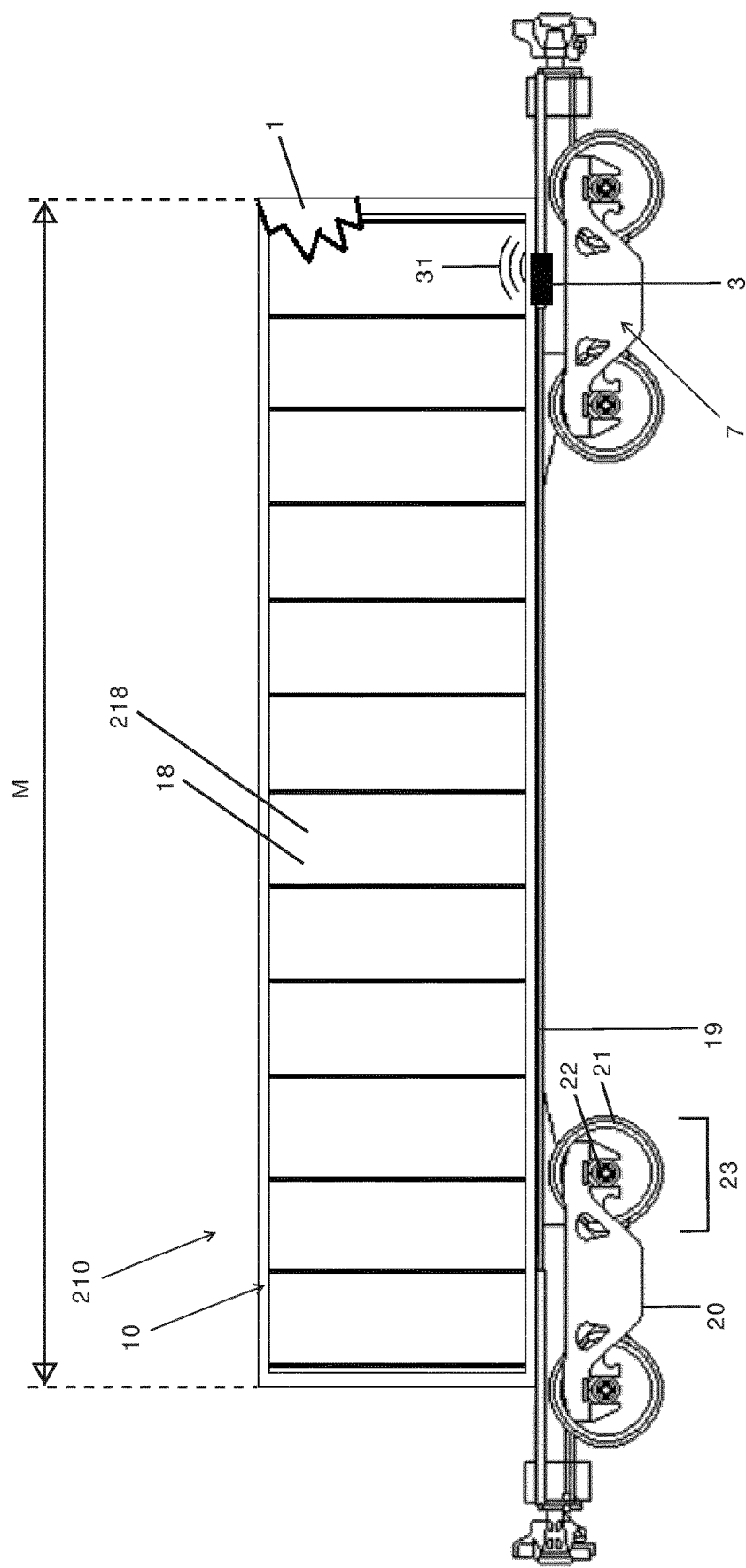
FIG. 2 shows a second example embodiment of a transport unit according to the present invention.

FIG. 1 and FIG. 2 shows a first and second example embodiment of a transport unit according to the present invention, respectively.

The transport unit 10, in both examples an unpowered cargo wagon 110, 210, comprises a chassis 19 with which the unpowered transport unit 10 is loosely laid on different stand-alone entities 23 consisting of one axle 22 and a pair of wheels 21, also referred to as wheelsets 23. The cargo wagon 110, 210 has two bogies 20, each comprising two wheelsets 23. The bogies 20 form a frame assembly which holds the wheelsets 23 and allow for rotation around a generally vertical axis of rotation with respect to the cargo wagon 110.

The cargo wagon 110, 210 is adapted for carrying a load bearing means 18. The load bearing means comprises a loading space 1.

Furthermore, the transport unit comprises a sensing module 3 according to the present invention, which is mounted on an outer surface of said transport unit 10. This may for instance concern one of the example sensing modules of Example 2. The sensing module 3 is part of the monitoring system 7 according to the present invention, allowing to evaluate the filling state indicative of the loading space 1 being filled or not. This is done by having the sensing module 3 generate an emitted sound wave 31 within the cargo wagon 110, 210 by means of an emitter (4 in FIGS. 3-4), converting a reflected sound wave in a reflected signal by means of a receiver (5 in FIGS. 3-4), and then evaluating said reflected sound wave. The sensing module 3 is compact in that the spacing between the emitter and the receiver does not exceed 200 mm.

In the example of FIG. 1, the cargo wagon 110 comprises said load bearing means 18 which is a cargo vessel 118, which may be permanently attached to the chassis 19, e.g. by welding. Given that the cargo vessel 118 is an integral part of the cargo wagon 110 and cannot be removed from it, the sensing module 3 may advantageously be mounted on an outer surface of said cargo vessel 118.

Furthermore, in the example of FIG. 1, the monitoring system 7 comprises a monitoring module 8 which entertains electronic wireless communication with the sensing module 3 via a short-range communication channel 30, as well as electronic wireless communication with a satellite network 81 via a long-range communication channel 80. This enables sending notifications comprising an evaluation by said monitoring system to a remote server (not shown). In an alternative embodiment (not shown), the sensing module may send notifications toward a remote server or a read-out device or mobile terminal directly, without intervention of any monitoring module 8.

In the second example embodiment, illustrated in FIG. 2, the transport unit 10 is a cargo wagon 210 comprising a chassis 19 suitable for carrying said load bearing means 18, said load bearing means 18 being a releasably attached load bearing means 218, preferably a container or a tank container. This attachment may for instance be realized with twist locks and corner castings, as is common in intermodal transport. In such a setup, wherein the load bearing means 18 may be removed and replaced, the sensing module 3 may advantageously be mounted on a portion of the transport unit 10 different from said load bearing means 18, in the example on said chassis 19.

Furthermore, in the example of FIG. 2, the sensing module may send notifications toward a remote server or a read-out device or mobile terminal directly, without intervention of any further system module. In an alternative embodiment (not shown), the monitoring system 7 may comprise a monitoring module with similar functioning as in the example of FIG. 1, i.e. with electronic wireless communication with the sensing module 3 via a short-range communication channel, and electronic wireless communication with a satellite network via a long-range communication channel.

Example 2: Two Example Embodiments of the Sensing Module

Figure 3:
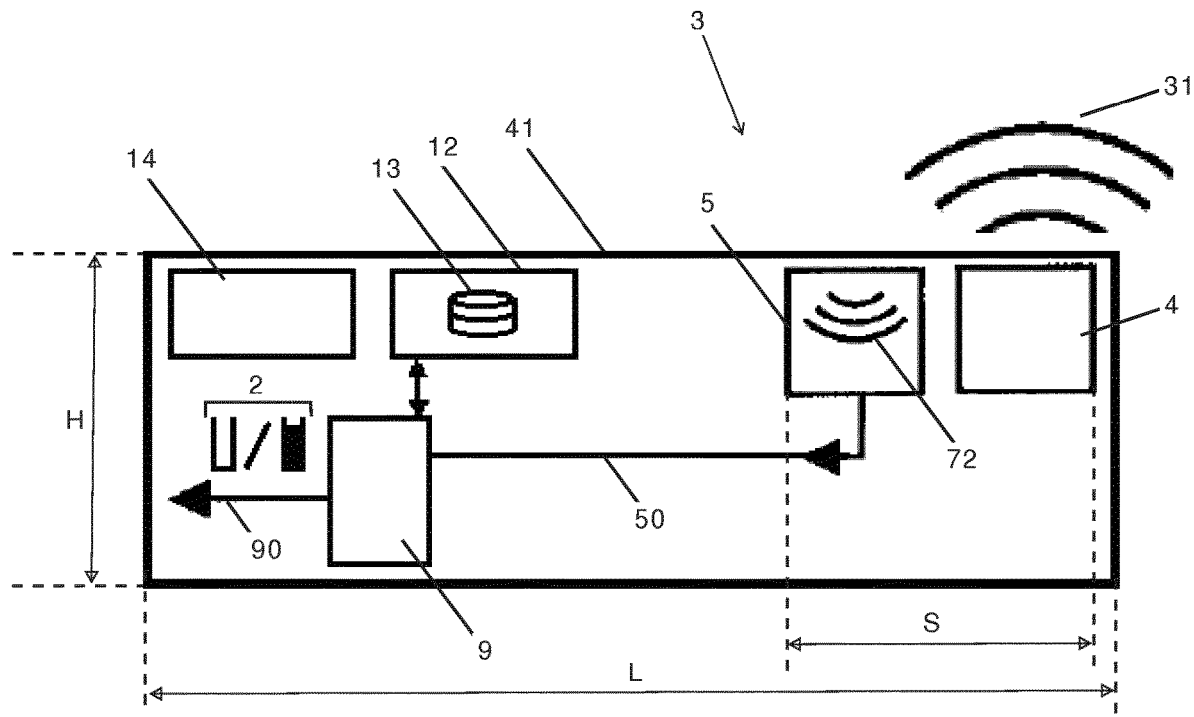
FIG. 3 shows a first example embodiment of a sensing module according to the present invention.
Figure 4:
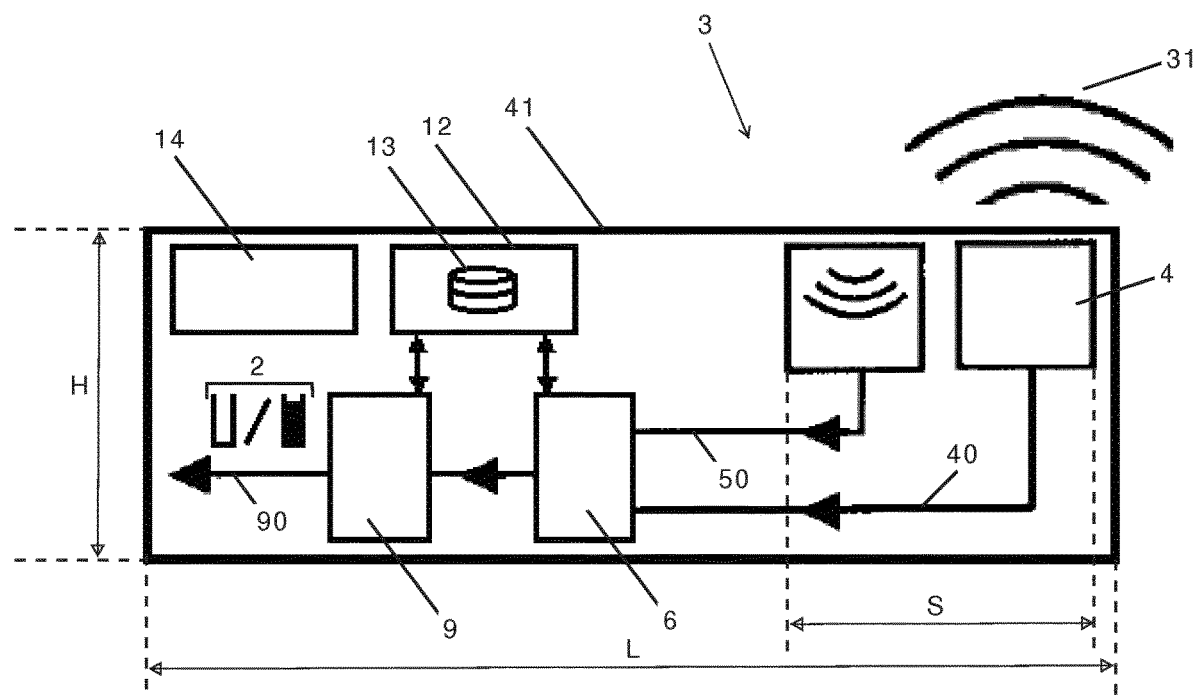
FIG. 4 shows a second example embodiment of a sensing module according to the present invention.

FIG. 3 and FIG. 4 show a first and second example embodiment of a sensing module according to the present invention, respectively. This sensing module 3 may be mounted on an outer surface of a transport unit such as those of Example 1. The sensing module 3 is part of the monitoring system 7 according to the present invention, allowing to evaluate the filling state indicative of the loading space 1 being filled or not.

To this end, the sensing module 3 of both FIGS. 3 and 4 comprises an emitter 4, a receiver 5, an evaluator 9 and a memory 12 comprising calibration data 13. Said sensing module 3 is configured for carrying out the steps of:

generating an emitted sound wave 31 within the transport unit 10 by means of said emitter 4;

converting a reflected sound wave 32 in a reflected signal 50 by means of said receiver 5; and evaluating said filling state 2 indicative of the loading space 1 being filled or not by means of said evaluator 9 based on at least said calibration data 13 and said reflected signal 50;

wherein a spacing S between said emitter 4 and said receiver 5 does not exceed 200 mm, preferably does not exceed 100 mm. Hereby, the filling state 2 may be comprised in an electronic filling state signal 90.

The sensing module 3 comprises and is surrounded by a housing 41, preferably a housing that does not interfere with the sending and receiving of sound waves and/or magnetic waves convertible in sound waves, such as a plastic housing. The length L and height H of the sensing module 3 both do not exceed 200 mm, said height H preferably does not exceed 100 mm. Placing both the emitter 4 and the receiver 5 within the sensing module 3 is advisable for practical purposes, allowing easy mounting and unmounting of the sensing module 3, with limited risk of damage from external factors such as blows or weather conditions, owing to the sensing module's compactness.

For the example embodiment of FIG. 4, the sensing module 3 further comprises a comparator 6, wherein said method comprises the additional step of comparing an emitted signal 40 converted from said emitted sound wave 31 received from said emitter 4 and said reflected signal 50 received from said receiver 5 by means of said comparator 6, generating a comparison signal 60 based thereon; and wherein said step of evaluating said filling state 2 is further based on said comparison signal 60. Such an embodiment advantageously takes into account phase delay information. This information may be particularly important where the load of the transport unit impacts the propagation speed of the sound waves, leading to impact on the phase, whereby the impact may be particularly strong in certain frequency bands and less pronounced or absent in other frequency bands. Hence, in a further preferred embodiment, the phase is compared and evaluated with respect to one, two, three or more frequency bands which are preferably pre-determined.

It is supposed that the present invention is not restricted to any form of realization described previously and that some modifications can be added to the presented example of fabrication without reappraisal of the appended claims. For example, the present invention has been described referring to transport units that are unpowered cargo wagons with a cargo vessel or a container, or containers or tank containers in themselves, but it is clear that the invention can be applied to unpowered or powered cargo wagons with tank containers or yet another type of load bearing means. Likewise, the invention can be applied to other types of transport units, such as roadway trucks, preferably trucks with containers or tank containers and/or trucks suitable for intermodal transport.

The invention claimed is:

1. Method for evaluating a filling state of a load bearing means by means of
    a monitoring system comprising a sensing module; said load bearing means adapted for being carried by a transport unit; said load bearing means comprising a loading space; said sensing module situated in proximity to said load bearing means and outside of said loading space; said sensing module comprising an emitter, a receiver, an evaluator and a memory comprising calibration data; said sensing module configured for carrying out the steps of:
    generating an emitted sound wave by means of said emitter;
    converting a reflected sound wave in a reflected signal by means of said receiver; and
    evaluating said filling state indicative of the loading space being filled or not by means of said evaluator based on at least said calibration data and said reflected signal;
    wherein a spacing (S) between said emitter and said receiver does not exceed 200 mm; and wherein a length (M) of said load bearing means, is not smaller than 4 m;
    wherein said evaluator is further configured for extracting a resonant frequency of the reflected sound wave for the load bearing means and/or the transport unit; wherein evaluating the filling state is based on at least comparing said resonant frequency of said load bearing means and/or the transport unit to at least said calibration data;
    and whereby said load bearing means is a cargo vessel for holding cargo.

2. Method according to claim 1, wherein said evaluator is further configured for extracting a frequency spectrum of the reflected sound wave and wherein evaluating the filling state is based on at least comparing said frequency spectrum to the calibration data.

3. Method according to claim 1, wherein said calibration data comprises at least one measurement relating to reflection data of said loading space.

4. Method according to claim 1, wherein said sensing module is mounted on said load bearing means outside of said loading space; wherein said loading bearing means comprises said sensing module and belongs to a transport unit being a cargo wagon.

5. Method according to claim 1, wherein said sensing module is mounted on said load bearing means outside of said loading space; wherein said load bearing means is a container or tank container, that comprises said sensing module.

6. Method according to claim 1, wherein said sensing module is mounted on a portion of said transport unit not belonging to said load bearing means; wherein said transport unit is a cargo wagon, said load bearing means being a container or a tank container.

7. Method according to claim 1, wherein said sensing module further comprises a comparator, wherein said method comprises the additional step of comparing an emitted signal (40) converted from said emitted sound wave received from said emitter and said reflected signal received from said receiver by means of said comparator, generating a comparison signal based thereon; and wherein said step of evaluating said filling state is further based on said comparison signal.

8. Method according to claim 1, wherein said evaluator is further configured for extracting a frequency-related indicator associated with at least one frequency band from said reflected signal and/or said comparison signal; wherein said evaluation is further configured for comparing said frequency-related indicator to a value comprised in said calibration data.

9. Method according to claim 1, wherein said memory further comprises at least one parameter relating to the application of a machine learning model to said calibration data; wherein said evaluator is further configured for updating said at least one parameter for training said machine learning model; wherein said evaluator is further configured for evaluating said filling state based on said at least one parameter relating to said machine learning model.

10. Method according to claim 1, wherein said sensing module is a wireless sensing module; wherein said sensing module comprises a battery or equivalent power source; wherein said sensing module comprises a sensing-module-related wireless interface for transmitting notifications; and wherein the method comprises the additional step of transmitting a notification comprising said filling state via said sensing-module-related wireless interface.

11. Method according to claim 10, wherein said monitoring system further comprises a monitoring module; wherein said monitoring module comprises first connection means for receiving said notification from said sensing module transmitted via said wireless interface; and wherein said monitoring module comprises a second connection means; and wherein said method comprises the additional step of transmitting said filling state to a remote server via said first and second connection means.

12. Method according to claim 1, wherein said monitoring system comprises a GNSS receiver and/or an accelerometer and/or a temperature measurement means; and wherein said sensing module comprises a length (L) and a height (H), said length (L) and height (H) both not exceeding 200 mm.

13. Kit for evaluating a filling state of a load bearing means, with a method according to claim 1; said load bearing means being a cargo vessel for holding cargo and adapted for being carried by a transport unit; said load bearing means comprising a loading space; said kit comprising:
a sensing module adapted either for being mounted on said load bearing means outside of said loading space or on a portion of said transport unit outside of said loading space; said sensing module comprising an emitter, a receiver, an evaluator, a sensing-module-related wireless interface, and a memory for storing calibration data; said sensing module configured for carrying out the steps of:
generating an emitted sound wave by means of said emitter;
converting a reflected sound wave in a reflected signal by means of said receiver; and
evaluating said filling state indicative of the loading space being filled or not by means of said evaluator based on at least said calibration data and said reflected signal, wherein said evaluator is further configured for extracting a resonant frequency of the reflected sound wave for the load bearing means and/or the transport unit, and wherein evaluating the filling state is based on at least comparing said resonant frequency of the load bearing means and/or the transport unit to at least said calibration data;
transmitting a notification comprising said filling state via said sensing-module-related wireless interface;
wherein a spacing (S) between said emitter and said receiver does not exceed 200 mm; and wherein a length (M) of said load bearing means, is not smaller than 4 m;
a monitoring module comprising a first connection means for receiving notifications from said sensing module and a second connection means; said monitoring module configured for carrying out the steps of:
receiving said notification comprising said filling state from said sensing module by means of said first connection means;
transmitting said filling state to a remote server by means of said second connection means.

14. The method according to claim 1, wherein the sound wave is a solid borne sound wave.

15. Monitoring system for evaluating a filling state of a load bearing means, said monitoring system comprising a sensing module; said load bearing means adapted for being carried by a transport unit; said load bearing means comprising a loading space, and said load bearing means being a cargo vessel for holding cargo; wherein said sensing module is mounted on said load bearing means outside of said loading space or on a portion of said transport unit outside of said loading space; said sensing module comprising an emitter, a receiver, an evaluator and a memory comprising calibration data; said sensing module configured for carrying out the steps of:
generating an emitted sound wave by means of said emitter;
converting a reflected sound wave in a reflected signal by means of said receiver; and
evaluating said filling state indicative of the loading space being filled or not by means of said evaluator based on at least said calibration data and said reflected signal;
wherein a spacing (S) between said emitter and said receiver does not exceed 200 mm; and wherein a length (M) of said load bearing means, is not smaller than 4 m;
wherein said evaluator is further configured for extracting a resonant frequency of the reflected sound wave for the load bearing means and/or the transport unit; wherein evaluating the filling state is based on at least comparing said resonant frequency of the load bearing means and/or the transport unit to at least said calibration data.

16. Transport unit, said transport unit being a cargo wagon, comprising a monitoring system for evaluating a filling state of a load bearing means, said monitoring system comprising a sensing module; said transport unit adapted for carrying said load bearing means; said load bearing means being a cargo vessel for holding cargo, belonging to said cargo wagon; said load bearing means comprising a loading space; wherein said sensing module is mounted on said load bearing means outside of said loading space or on a portion of said transport unit outside of said bearing means; said sensing module comprising an emitter, a receiver, an evaluator and a memory comprising calibration data; said sensing module configured
for carrying out the steps of:
generating an emitted sound wave by means of said emitter;
converting a reflected sound wave in a reflected signal by means of said receiver; and
evaluating said filling state indicative of the loading space being filled or not by means of said evaluator based on at least said calibration data and said reflected signal;
wherein a spacing S between said emitter and said receiver does not exceed 200 mm; and wherein a length (M) of said load bearing means, is not smaller than 4 m;
wherein said evaluator is further configured for extracting a resonant frequency of the reflected sound wave for the load bearing means and/or the transport unit; wherein evaluating the filling state is based on at least comparing said resonant frequency of the load bearing means and/or the transport unit to at least said calibration data.

* * * * *